(12) United States Patent
Chang, Jr. et al.

(10) Patent No.: US 10,690,006 B2
(45) Date of Patent: Jun. 23, 2020

(54) SHIELDING POCKETS FOR CASE HOLES

(71) Applicants: United Technologies Corporation, Hartford, CT (US); Mitsubishi Heavy Industries America, Inc., New York, NY (US)

(72) Inventors: Hoyt Y. Chang, Jr., Manchester, CT (US); Yusuke Ichihashi, Komaki (JP); Yohei Fujimoto, New York, NY (US); Timothy Dale, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 784 days.

(21) Appl. No.: 14/913,621

(22) PCT Filed: Sep. 12, 2014

(86) PCT No.: PCT/US2014/055448
§ 371 (c)(1),
(2) Date: Feb. 22, 2016

(87) PCT Pub. No.: WO2015/038931
PCT Pub. Date: Mar. 19, 2015

(65) Prior Publication Data
US 2016/0201511 A1    Jul. 14, 2016

Related U.S. Application Data

(60) Provisional application No. 61/877,696, filed on Sep. 13, 2013.

(51) Int. Cl.
*F01D 25/24* (2006.01)
*F01D 25/14* (2006.01)
*F23R 3/00* (2006.01)

(52) U.S. Cl.
CPC ............ *F01D 25/24* (2013.01); *F23R 3/002* (2013.01); *F01D 25/14* (2013.01); *F05D 2250/20* (2013.01); *F05D 2250/712* (2013.01); *F05D 2250/713* (2013.01); *F05D 2260/941* (2013.01);
(Continued)

(58) Field of Classification Search
CPC . F02C 7/20; F01D 25/14; F01D 25/24; F01D 25/28; F23R 3/002; F23R 3/06; F23R 2900/00005; F23R 2900/03045; F05D 2250/712; F05D 2260/941
See application file for complete search history.

(56) References Cited

U.S. PATENT DOCUMENTS

| 3,899,882 A * | 8/1975 | Parker ................... F23R 3/045 60/752 |
| 4,378,961 A | 4/1983 | Trousdell |
| 4,828,441 A | 5/1989 | Frasca |

(Continued)

OTHER PUBLICATIONS

EP search report for EP14844779.0 dated Oct. 31, 2016.

*Primary Examiner* — Gerald L Sung
*Assistant Examiner* — James P McGlynn
(74) *Attorney, Agent, or Firm* — Getz Balich LLC

(57) ABSTRACT

A case is provided for a gas turbine engine. The case includes a wall defining a through-hole. The case also includes first and second pockets adjacent to, and on opposite sides, of the through hole. A method of reducing stress in a case of a gas turbine engine is also provided that includes reducing stress about a through-hole by providing a concavity on each side of the through-hole.

20 Claims, 11 Drawing Sheets

(52) U.S. Cl.
CPC ... *F23R 2900/00005* (2013.01); *Y02T 50/671* (2013.01)

(56) References Cited

U.S. PATENT DOCUMENTS

| | | |
|---|---|---|
| 5,160,248 A | 11/1992 | Clarke |
| 5,485,723 A | 1/1996 | McCoy et al. |
| 5,503,490 A | 4/1996 | Melton |
| 5,551,790 A | 9/1996 | Melton |
| 5,653,581 A | 8/1997 | Dixon et al. |
| 6,237,344 B1 * | 5/2001 | Lee ............... F01D 5/186 165/908 |
| 7,100,358 B2 | 9/2006 | Gekht et al. |
| 8,021,109 B2 * | 9/2011 | Kneeland ............ F01D 25/14 165/181 |
| 8,092,168 B2 | 1/2012 | Vedhagiri et al. |
| 8,152,447 B2 * | 4/2012 | Duchatelle .......... B64D 27/26 415/108 |
| 8,230,569 B2 | 7/2012 | Anantharaman et al. |
| 8,245,399 B2 | 8/2012 | Anantharaman et al. |
| 8,307,628 B2 | 11/2012 | Hoyland |
| 2003/0131603 A1 * | 7/2003 | Bolender .............. F23R 3/002 60/772 |
| 2004/0037641 A1 * | 2/2004 | Wagner ................ F01D 5/066 403/408.1 |
| 2006/0133938 A1 | 6/2006 | Ellis et al. |
| 2007/0014631 A1 * | 1/2007 | Wagner ................ F01D 5/066 403/408.1 |
| 2010/0181366 A1 * | 7/2010 | Anantharaman ....... B23P 6/002 228/103 |
| 2012/0240584 A1 | 9/2012 | Berdou et al. |
| 2013/0195643 A1 | 8/2013 | Bharath et al. |
| 2018/0135415 A1 * | 5/2018 | Stone .................. B64D 27/10 |

* cited by examiner

SHIELDING POCKETS FOR CASE HOLES

CROSS-REFERENCE TO RELATED APPLICATION

This application claims priority to PCT Patent Application No. PCT/US2014/055448 filed Sep. 12, 2014, which claims priority to U.S. Provisional Patent Application No. 61/877,696 filed Sep. 13, 2013, which are hereby incorporated herein by reference in their entireties.

BACKGROUND

The present disclosure relates to a gas turbine engine and, more particularly, to a case therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The combustor section typically includes an outer shell lined with heat shields to form a combustion chamber. The combustion chamber is surrounded by a diffuser case formed of an inner and outer case, where the inner case defines a pre-diffuser and the outer case serves as structural containment. Together the cases form the flowpath and necessary volume to mitigate unrecoverable compressor surge. Although effective, the diffuser case includes multiple through-holes which may form undesirable stress concentrations.

SUMMARY

A case for a gas turbine engine, according to one disclosed non-limiting embodiment of the present disclosure, includes a wall defining a through-hole. The case also includes first and second pockets adjacent to, and on opposite sides, of the through hole.

In a further embodiment of the present disclosure, at least one of the first or the second pockets each includes a circular periphery.

In a further embodiment of the present disclosure, at least one of the first or the second pockets each includes a race track shaped periphery.

In a further embodiment of any of the foregoing embodiments of the present disclosure, at least one of the first or the second pockets each includes a rectilinear shaped periphery.

In a further embodiment of any of the foregoing embodiments of the present disclosure, the first or the second pockets circumferentially flank the through-hole.

In a further embodiment of any of the foregoing embodiments of the present disclosure, at least one of the first or second pockets each extends a depth from the inner surface of between 10%-50% of a thickness of the wall.

In a further embodiment of any of the foregoing embodiments of the present disclosure, at least one of the first or the second pocket is 100%-500% a diameter of the through-hole.

In a further embodiment of any of the foregoing embodiments of the present disclosure, an outer periphery of at least one of the first or second pockets is each circumferentially spaced a distance from an outer diameter of the through-hole along a hoop line. The distance is between 10%-100% the diameter of the through-hole.

In a further embodiment of any of the foregoing embodiments of the present disclosure, at least one pocket extends for a depth from the inner surface between 10%-50% a thickness of the wall and has a diameter of 100%-500% of a diameter of the through-hole. The pocket has an outer edge circumferentially spaced a distance from a surface defining the through-hole along a hoop line. The distance is between 10%-400% of the diameter of the through-hole.

In a further embodiment of any of the foregoing embodiments of the present disclosure, the wall is an outer wall of a diffuser case.

In a further embodiment of any of the foregoing embodiments of the present disclosure, the through-hole is located through a boss.

A method of reducing stress in a case of a gas turbine engine, according to another disclosed non-limiting embodiment of the present disclosure, includes reducing stress about a through-hole by providing a concavity on each side of the through-hole.

In a further embodiment of any of the foregoing embodiments of the present disclosure, the method includes defining each pocket in an inner surface of a wall.

In a further embodiment of any of the foregoing embodiments of the present disclosure, the method includes defining each pocket for a depth from an inner surface of the case between 10%-50% of a thickness of the wall.

In a further embodiment of any of the foregoing embodiments of the present disclosure, the method includes defining each pocket with an outer edge having a diameter of between 100%-500% of a diameter of the through-hole.

In a further embodiment of any of the foregoing embodiments of the present disclosure, the method includes circumferentially spacing each pocket a distance along a hoop line from between 10%-400% of a diameter of the through-hole.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
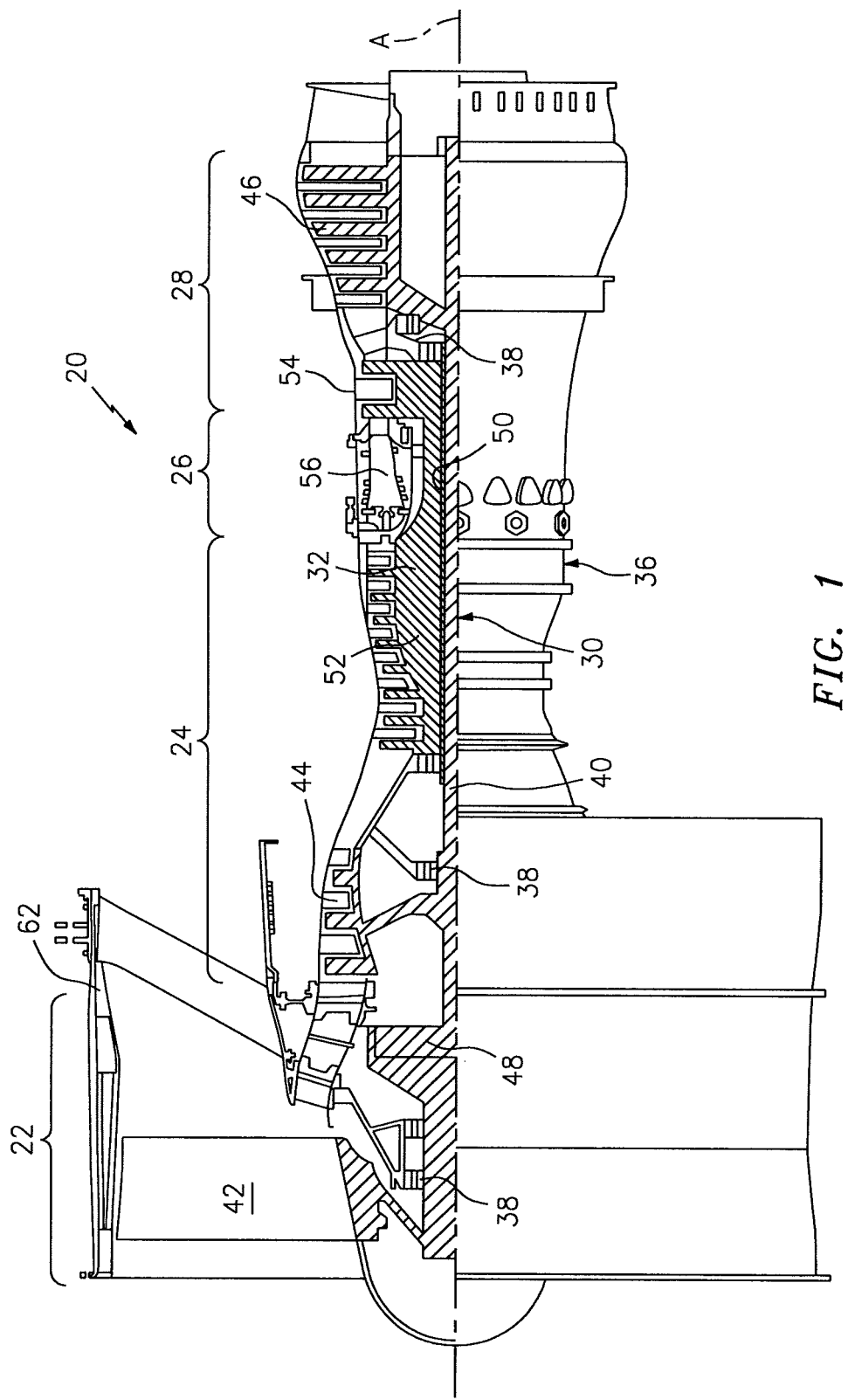
FIG. 1 is a schematic cross-section of an example gas turbine engine architecture.
Figure 2:
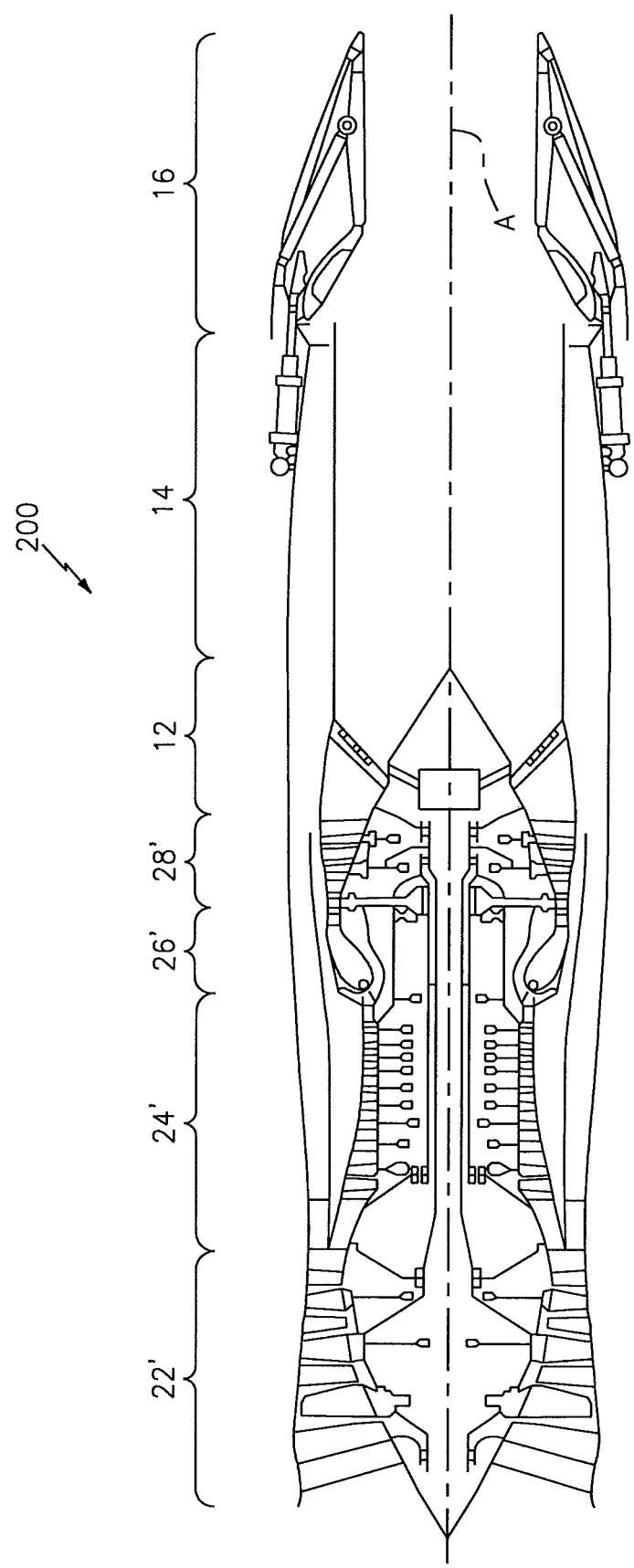
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Another alternative engine architecture 200 might include an augmentor section 12, an exhaust duct section 14 and a nozzle section 16 in addition to the fan section 22', compressor section 24', combustor section 26' and turbine section 28' (see FIG. 2). Although depicted as an aero engine in the disclosed non-limiting embodiments, it should be understood that the concepts described herein are not so limited and the teachings may be applied to other types of turbine engines such as a turbojets, turboshafts, and three-spool (plus fan) turbofans with an intermediate spool.

Referring to FIG. 1, the fan section 22 drives air along a bypass flowpath and into the compressor section 24. The compressor section 24 drives air along a core flowpath for compression and communication into the combustor section 26, which then expands and directs the air through the turbine section 28. The engine 20 generally includes a low spool 30 and a high spool 32 mounted for rotation about an engine central longitudinal axis A relative to an engine case assembly 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly (see FIG. 2) or through a geared architecture 48 (see FIG. 1) to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and the HPT 54 rotationally drive the respective low spool 30 and the high spool 32 in response to the expansion. The main engine shafts 40, 50 are supported at a plurality of points by the bearing structures 38 within the static structure 36.

In one non-limiting example, the gas turbine engine 20 is a high-bypass geared aircraft engine with a bypass ratio greater than about six (6:1). The geared architecture 48 can include an epicyclic gear train, such as a planetary gear system or other gear system. The example epicyclic gear train has a gear reduction ratio of greater than about 2.3:1, and in another example, is greater than about 2.5:1. The geared turbofan enables operation of the low spool 30 at higher speeds which can increase the operational efficiency of the LPC 44 and the LPT 46 to render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In another non-limiting example, the bypass ratio of the gas turbine engine 20 is greater than about ten (10:1), the fan diameter is significantly larger than that of the LPC 44, and the LPT 46 has a pressure ratio greater than about five (5:1). It should be appreciated, however, that the above parameters are only exemplary of a geared architecture engine and that the present disclosure is applicable to other gas turbine engines including direct drive turbofans.

In an example high-bypass turbofan embodiment, significant thrust is provided by the bypass flow path due to the high bypass ratio as the fan section 22 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a fan blade of the fan section 22 without the use of a Fan Exit Guide Vane system. The low Fan Pressure Ratio according to one example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to the example gas turbine engine 20 is less than about 1150 fps (351 m/s).

Figure 3:
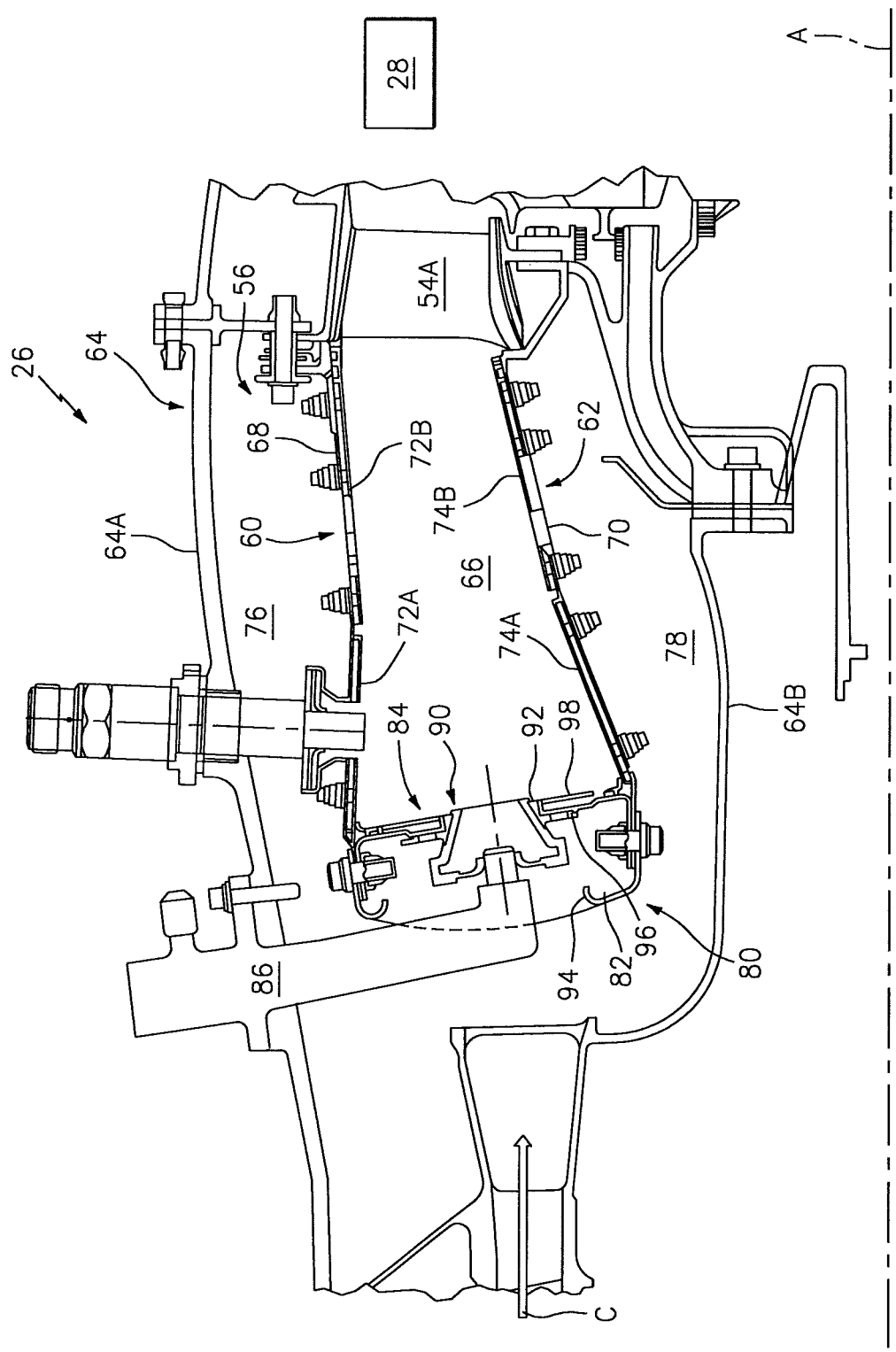
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor wall assembly 60, an inner combustor wall assembly 62 and a diffuser case 64. The outer combustor wall assembly 60 and the inner combustor wall assembly 62 are spaced apart such that an annular combustion chamber 66 is defined therebetween.

The outer combustor wall assembly 60 is spaced radially inward from an outer diffuser case 64A of the diffuser case 64 to define an outer annular plenum 76. The inner combustor wall assembly 62 is spaced radially outward from an inner diffuser case 64B of the diffuser case 64 to define an inner annular plenum 78. It should be understood that although a particular combustor is illustrated, other combustor types with various combustor wall and diffuser case arrangements will also benefit herefrom.

The combustor wall assemblies 60, 62 contain the combustion products for direction toward the turbine section 28. Each combustor wall assembly 60, 62 generally includes a respective support shell 68, 70 which supports one or more liner panels 72, 74 mounted within the respective support shell 68, 70. Each of the liner panels 72, 74 may be generally rectilinear with a circumferential arc and manufactured of, for example, a nickel based super alloy, ceramic or other temperature resistant material and are arranged to form a liner array. In one disclosed non-limiting embodiment, the liner array includes a multiple of forward liner panels 72A and a multiple of aft liner panels 72B that are circumferentially staggered to line the outer shell 68. A multiple of forward liner panels 74A and a multiple of aft liner panels 74B are circumferentially staggered to line the inner shell 70.

The combustor 56 further includes a forward assembly 80 immediately downstream of the compressor section 24 (see FIG. 1) to receive compressed airflow therefrom. The forward assembly 80 generally includes an annular hood 82 and a bulkhead assembly 84 that support a multiple of fuel nozzles 86 (one shown) and a multiple of swirlers 90 (one shown). The annular hood 82 extends radially between, and is secured to, the forwardmost ends of the combustor wall assemblies 60, 62. The annular hood 82 includes a multiple of circumferentially distributed hood ports 94 that accommodate the respective fuel nozzle 86 and introduce air into the forward end of the combustion chamber 66 through a respective swirler 90. The bulkhead assembly 84 includes a bulkhead support shell 96 secured to the combustor wall assemblies 60, 62, and a multiple of circumferentially distributed bulkhead liner panels 98 secured to the bulkhead support shell 96. Each fuel nozzle 86 may be secured to the diffuser case 64 and project through one of the hood ports 94 and respective swirlers 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54 (see FIG. 1). The NGVs 54A are static engine components which direct core airflow combustion gases onto turbine blades in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation.

Figure 4:
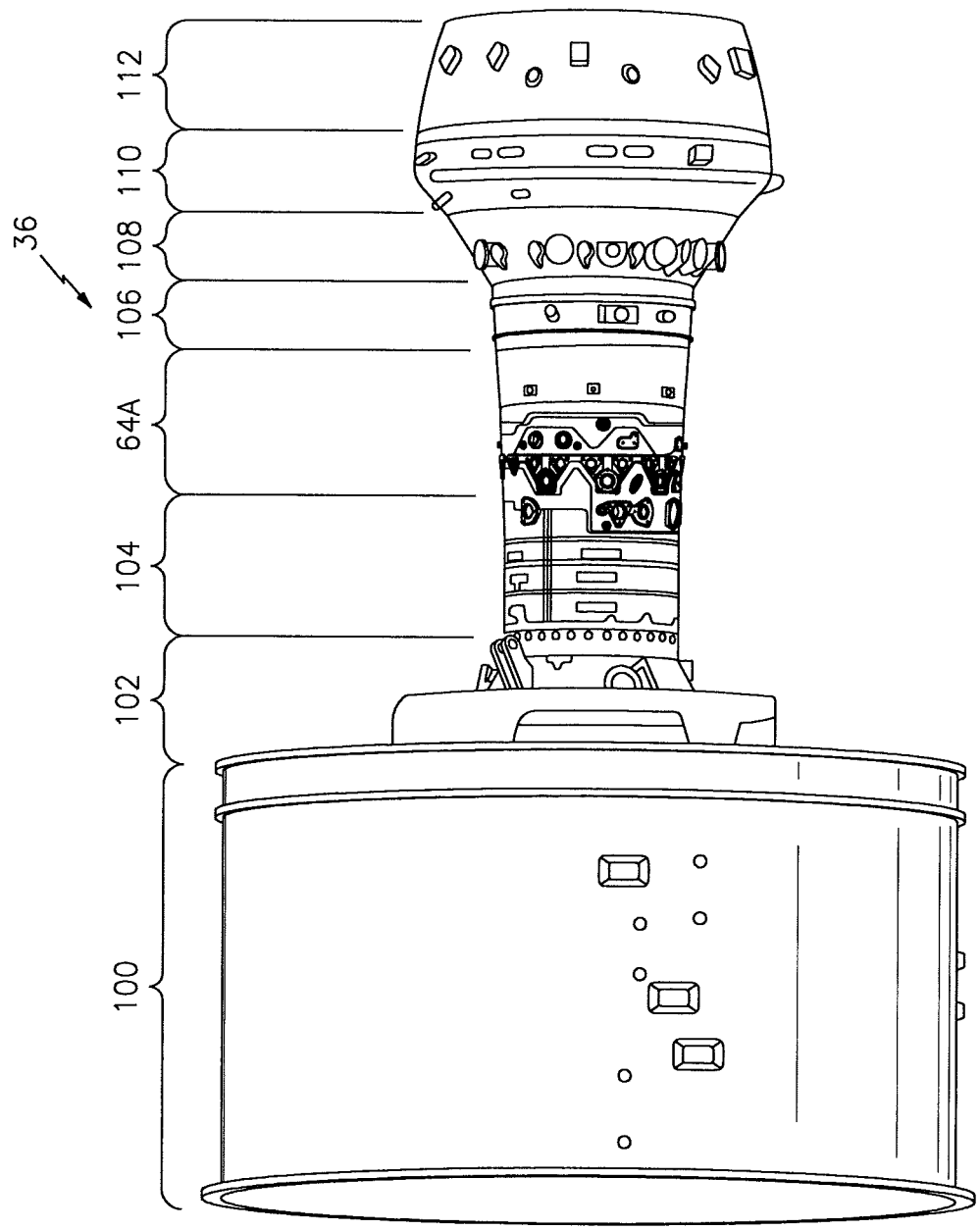
FIG. 4 is a schematic view of a gas turbine engine case assembly.

With reference to FIG. 4, the engine case assembly 36 generally includes a multiple of cases or modules in addition to the outer diffuser case 64A to include, for example, a fan case 100, an intermediate case 102, a HPC case 104, the outer diffuser case 64A, a HPT case 106, a mid turbine frame (MTF) case 108, a LPT case 110, and a Turbine Exhaust Case (TEC) 112. The fan case 100 is bolted to the intermediate case 102, which is bolted to the HPC case 104, which is bolted to the outer diffuser case 64A, which is bolted to the HPT case 106, which is bolted to the MTF case 108, which is bolted to the LPT case 110, which is bolted to the TEC 112 each at a respective flange. It should be understood that the order of assembly may not necessarily follow the disclosed description and that various additional or alternative cases may be provided.

Figure 5:
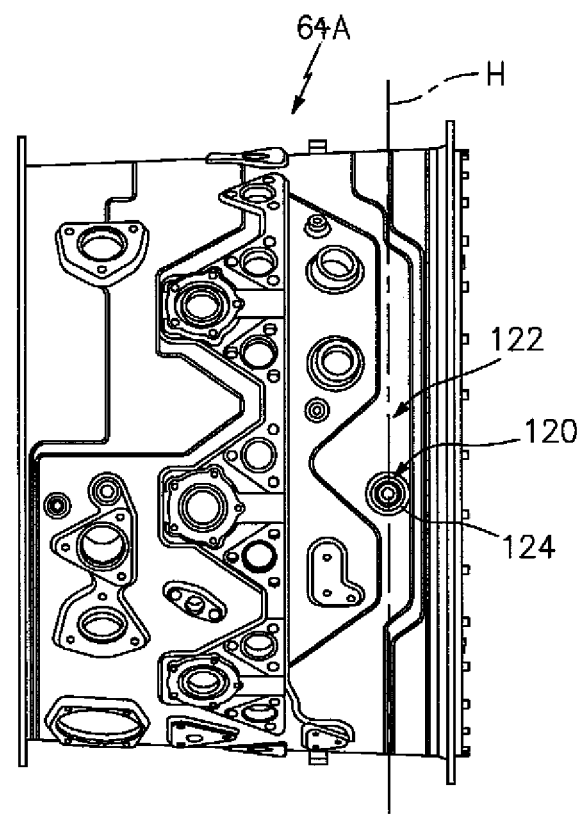
FIG. 5 is an expanded schematic view of a case.
Figure 6:
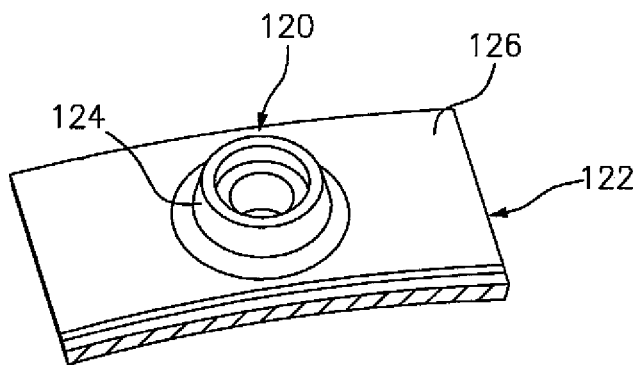
FIG. 6 is an expanded outer perspective view of a through-hole in the case.

With reference to FIG. 5, the outer diffuser case 64A generally includes a multiple of through-holes 120 which penetrate through a wall 122 typical of holes configured to receive instrumentation such as a borescope, threaded holes for bolts to mount various components such as the fuel injectors and other types of apertures. The through-holes 120 may be defined through a boss 124 or other feature which extends from an outer surface 126 of the wall 122 (see FIG. 6). It should be appreciated that various through-holes inclusive of those through a boss, not through a boss, or other through-holes will benefit herefrom.

The outer diffuser case 64A is pressurized, which produces hoop stresses in the wall 122. At the holes 120, stresses are relatively high. The through-holes 120 create high stress concentrations in the wall material that may otherwise reduce the strength and life of the component. To reduce these stresses, an inner surface 128 of the wall 122 includes pockets 130 which are operatively disposed adjacent to and circumferentially flank each through-hole 120 (see FIG. 7). A single through-hole 120 requires two pockets 130. That is, the pockets 130 are located on either side of the through-hole 120 in the hoop direction along a hoop line H such that the pockets 130 are aligned with the stress state such as the hoop stresses to break or otherwise shield the through-hole 120 from the nominal local stresses. It will be appreciated by those skilled in the art that such pockets 130 provide space for material of wall 122 to deform, expand, and/or contract, and thus reduce stresses in the wall material defining the through-holes 120.

Figure 7:
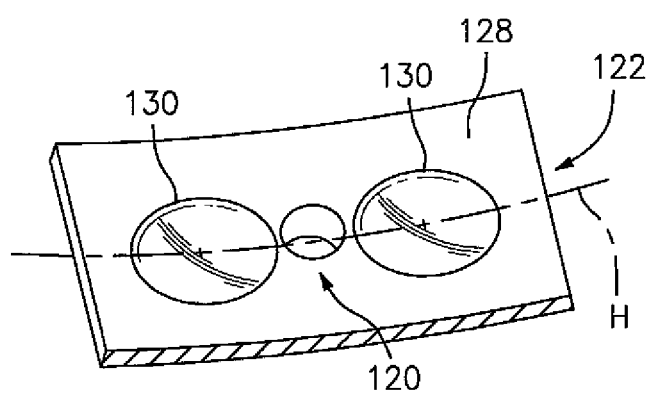
FIG. 7 is an expanded inner perspective view of a through-hole in the engine case and pockets formed therein.
Figure 8:
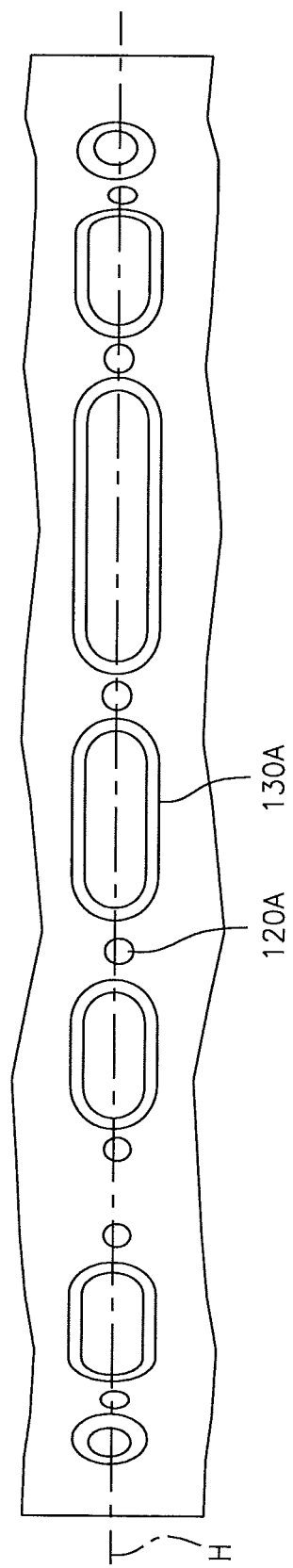
FIG. 8 is an expanded inner perspective view of the through-holes with corresponding pockets according to one disclosed non-limiting embodiment.
Figure 9:
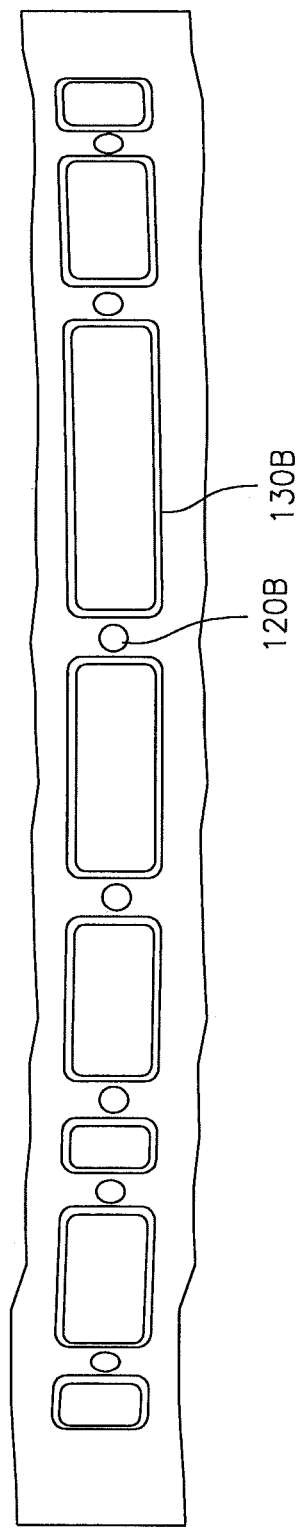
FIG. 9 is an expanded inner perspective view of the through-holes and pockets according to another disclosed non-limiting embodiment.
Figure 10:
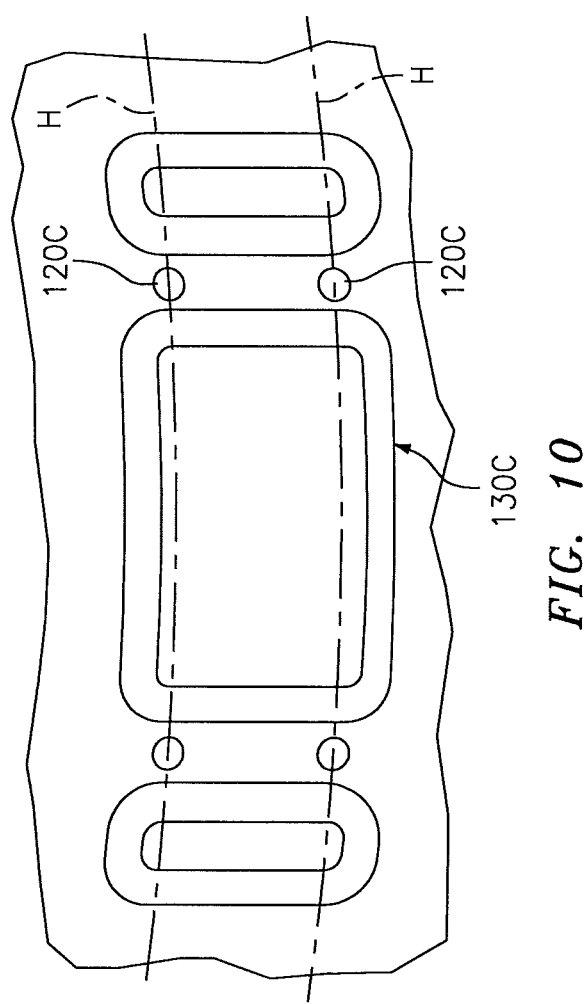
FIG. 10 is an expanded inner perspective view of the through-holes and pockets according to another disclosed non-limiting embodiment.

With reference to FIG. 7, the pockets 130 have a circular outer edge. However, race track pockets 130A (FIG. 8), rectilinear pockets 130B (FIG. 9) or other shapes can alternatively or additionally be utilized. That is, an arrangement of multiple through holes 120C in proximity may blend multiple pockets 130C (FIG. 10) which form other shield pocket geometries, e.g., race track, rectilinear etc.

Figure 11:
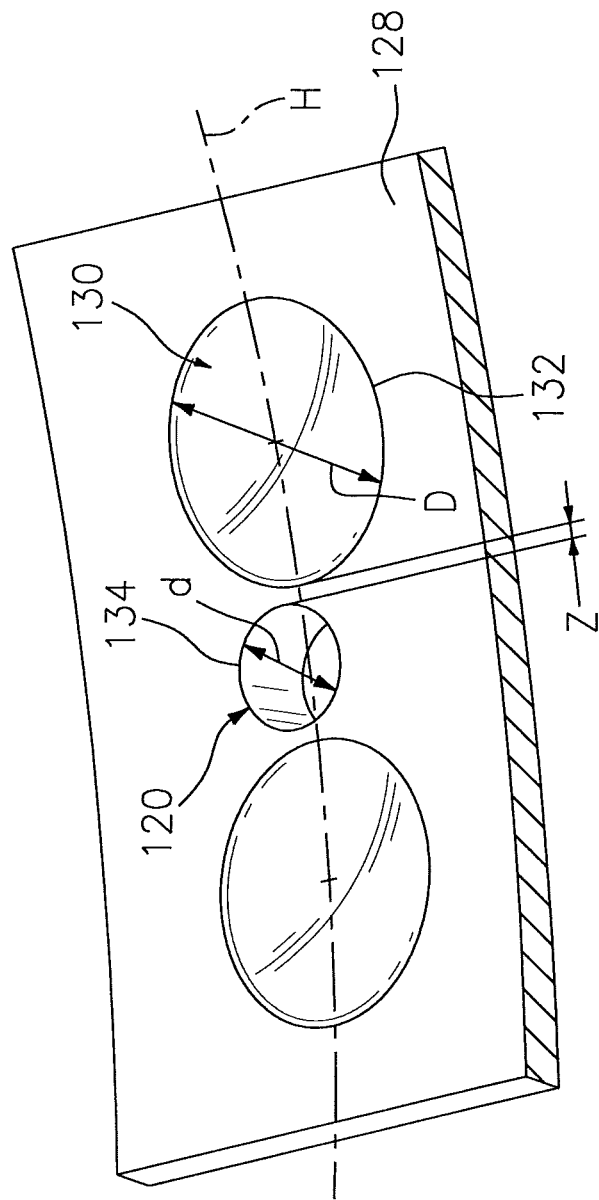
FIG. 11 is an inner perspective view of a through hole with corresponding pockets defined in the case assembly according to another disclosed non-limiting embodiment.
Figure 12:
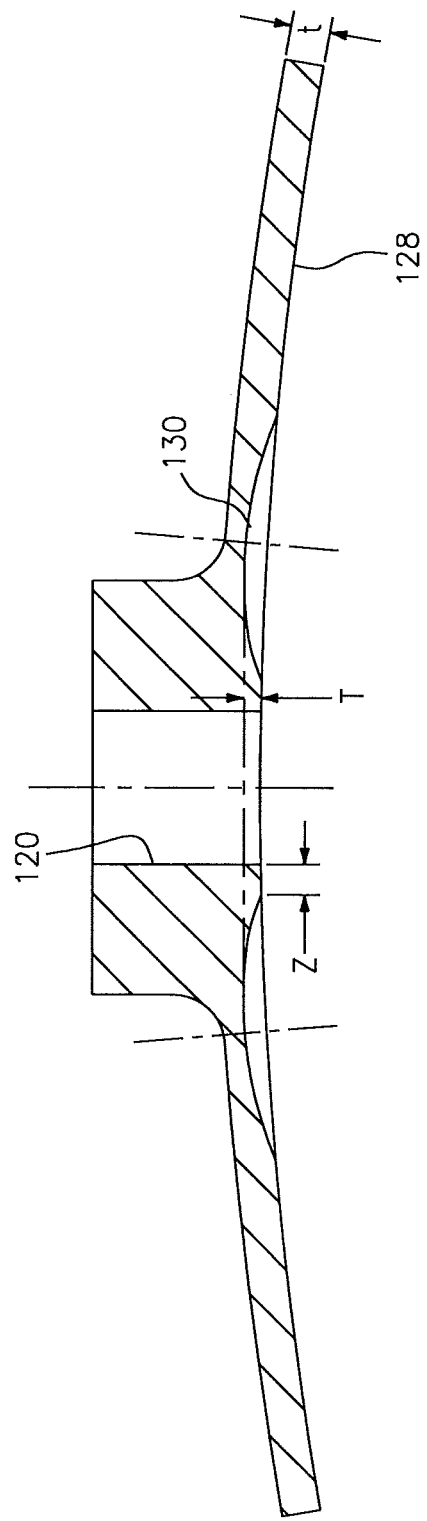
FIG. 12 is a lateral sectional view showing the pockets of FIG. 11.

With reference to FIG. 11, in one disclosed non-limiting embodiment, the pockets 130 are generally larger than the through-hole 120 and, preferably, are of a diameter D 100%-500% of a diameter D of the through-hole 120. The pockets 130 may be dimple shaped and extend from the inner surface 128 for a depth T of between 10%-50% a thickness 't' of the wall 122 (FIG. 12). It should be appreciated that the pockets 130 may alternatively include a flat bottom, a curved bottom, or be spherical in shape. An outer diameter 132 of each of the pockets 130 are also circumferentially spaced a distance Z from an outer diameter 134 of the through-hole 120 along the hoop line H from between 10%-100% the diameter of the through-hole 120. It should be appreciated that various combinations of the above non-limiting embodiment parameters as well as others will also benefit herefrom.

Figure 13:
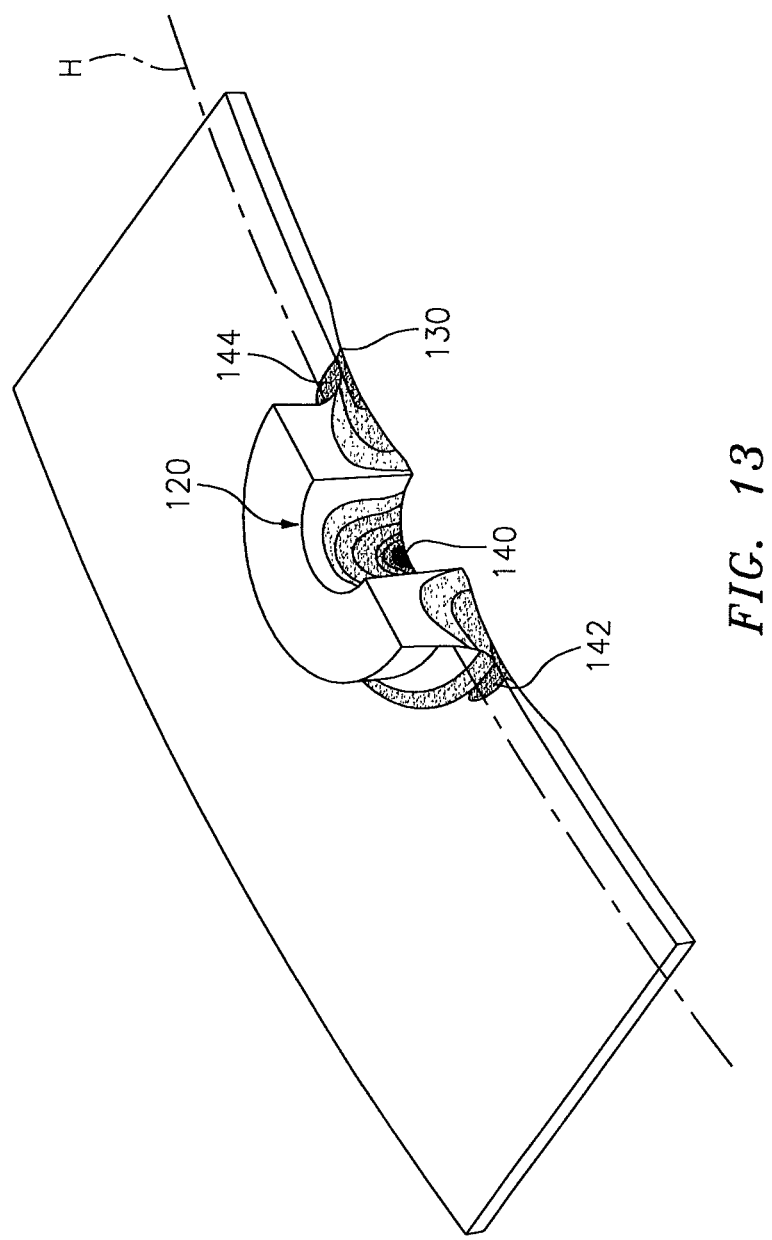
FIG. 13 is a perspective sectional view showing example stress concentrations adjacent to the pockets of FIG. 11.

With reference to FIG. 13, the pockets 130 reduce the stress in and around material disposed about an inner periphery of the through-hole 120, which increases the strength and reduces crack initiation at that location. The pockets 130, in one tested example, reduce stress by approximately 10% at the critical stress location 140, but increase stress in non-critical areas, locations 142 and 144. Relatively deeper pockets 130 drive higher stress into locations 142 and 144 to reduce stress at location 140 such that optimal pocket 130 depth T results in a desired balance of stress. The pockets 130 also advantageously reduce weight.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein; however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A case for a gas turbine engine, the case comprising:
   a wall defining a through-hole, the wall configured with a base and a boss projecting out from the base, and the through-hole extending through the boss; and
   first and second pockets adjacent to, and on opposite sides, of the through-hole;
   wherein at least one of the first pocket or the second pocket includes a circular periphery;
   wherein the wall extends axially along and circumferentially around an axis;
   wherein the boss axially and circumferentially overlaps a first portion of the first pocket such that the boss is axially and circumferentially aligned with the first portion of the first pocket relative to the axis; and
   wherein the boss is circumferentially adjacent a second portion of the first pocket.

2. The case as recited in claim 1, wherein the first and the second pockets circumferentially flank the through-hole.

3. The case as recited in claim 1, wherein at least one of the first or the second pockets each extends a depth from an inner surface of between 10%-50% of a thickness of the wall.

4. The case as recited in claim 1, wherein a diameter of at least one of the first pocket or the second pocket is 100%-500% a diameter of the through-hole.

5. The case as recited in claim 1, wherein an outer periphery of at least one of the first or the second pockets is circumferentially spaced a distance from an outer diameter of the through-hole along a hoop line, and the distance is between 10%-100% the diameter of the through-hole.

6. The case as recited in claim 1, wherein
   at least the first pocket or the second pocket extends for a depth from an inner surface between 10%-50% a thickness of the wall and has a diameter of 100%-500% of a diameter of the through-hole; and
   the at least the first pocket or the second pocket has an outer edge circumferentially spaced a distance from an outer edge of the through-hole along a hoop line, and the distance is between 10%-100% of the diameter of the through-hole.

7. The case as recited in claim 1, wherein the wall is an outer wall of a diffuser case.

8. The case of claim 1, wherein the boss does not circumferentially overlap the second portion of the first pocket.

9. The case of claim 1, wherein the boss and the first pocket are disposed on opposing sides of the base.

10. The case of claim 1, wherein the boss has a circular outer peripheral edge.

11. A method of reducing stress in a case of a gas turbine engine, comprising:
    reducing stress about a through-hole by providing a first concavity and a second concavity on opposing sides of the through-hole;
    wherein the case extends axially along and circumferentially around an axis;
    wherein the case includes a boss that projects out from a first side surface of the case, and the through-hole extends through the boss;
    wherein the first concavity extends into the case from a second side surface of the case that is opposite the first side surface of the case; and
    wherein the first concavity is configured with a circular periphery that partially circumferentially and axially overlaps the boss relative to the axis such that the circular periphery is axially and circumferentially aligned with the boss relative to the axis.

12. The method as recited in claim 11, further comprising defining each of the first concavity and the second concavity in an inner surface of a wall, wherein the second side surface of the case is the inner surface of the wall.

13. The method as recited in claim 11, further comprising defining each of the first concavity and the second concavity for a depth from an inner surface of the case between 10%-50% of a thickness of the wall.

14. The method as recited in claim 11, further comprising defining each of the first concavity and the second concavity with an outer edge having a diameter of between 100%-500% of a diameter of the through-hole.

15. The method as recited in claim 11, further comprising circumferentially spacing each of the first concavity and the second concavity a distance along a hoop line from between 10%-100% of a diameter of the through-hole.

16. A gas turbine engine assembly, comprising:
    a case comprising a wall configured with a boss, a through-hole, a first pocket and a second pocket;
    the wall extending axially along and circumferentially around an axis of the case;
    the through-hole extending through the boss;
    the first pocket and the second pocket arranged adjacent to and on opposing circumferential sides of the through-hole;
    the wall comprising a first concave surface that forms the first pocket; and
    a portion of the first concave surface axially and circumferentially overlapped by the boss such that the boss is axially and circumferentially aligned with the portion of the first concave surface relative to the axis.

17. The gas turbine engine assembly of claim 16, wherein the first pocket is configured with a circular periphery.

18. The gas turbine engine assembly of claim 16, wherein the first through-hole, the first pocket and the second pocket are arranged along a hoop line.

19. The gas turbine engine assembly of claim 16, wherein a center of the through-hole is axially offset from a center of the first pocket along the axis.

20. The gas turbine engine of claim 16, wherein
    the wall further comprises a second concave surface that forms the second pocket; and the second concave surface extends along a continuously curved line as the second concave surface extends between opposing edges of the second pocket when viewed in a plane parallel to the centerline of the first through-hole.

\* \* \* \* \*